United States Patent Office
3,398,530
Patented Aug. 27, 1968

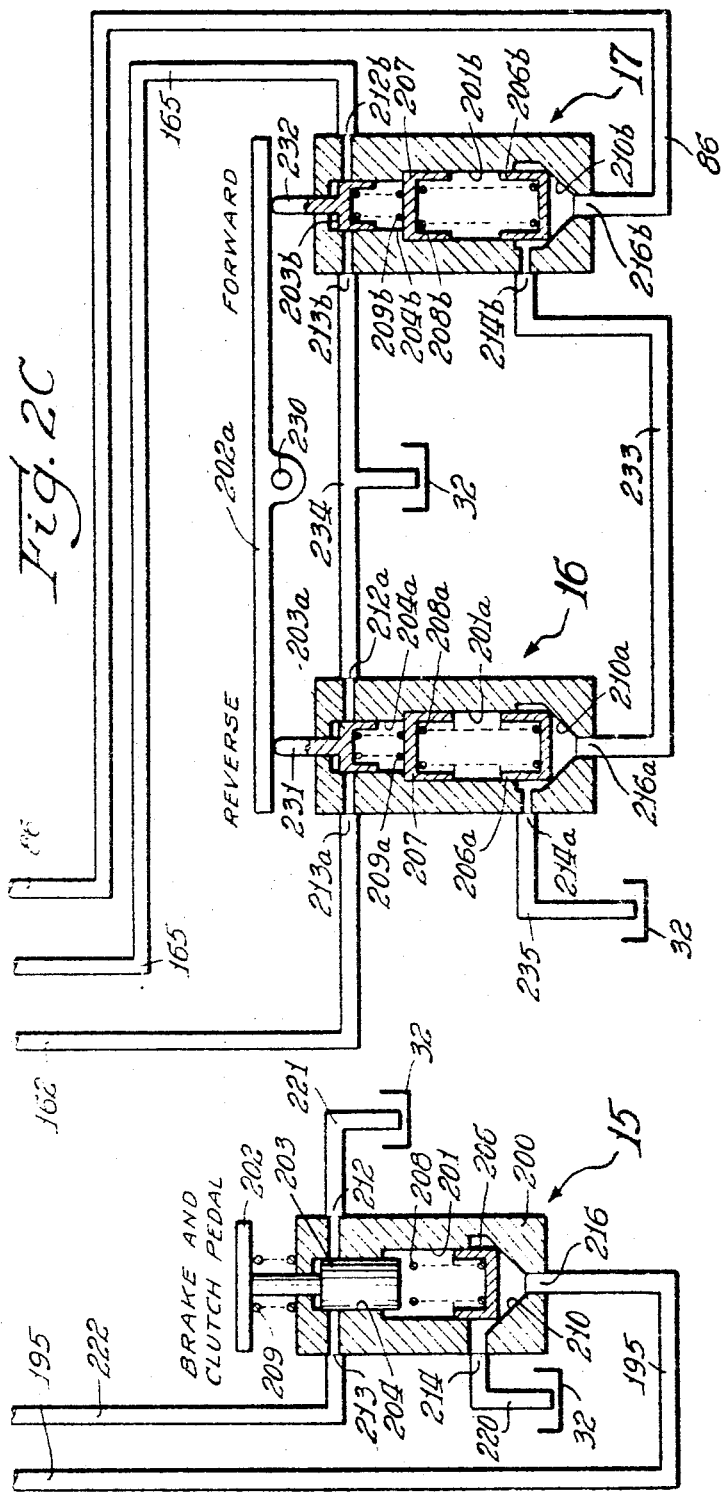

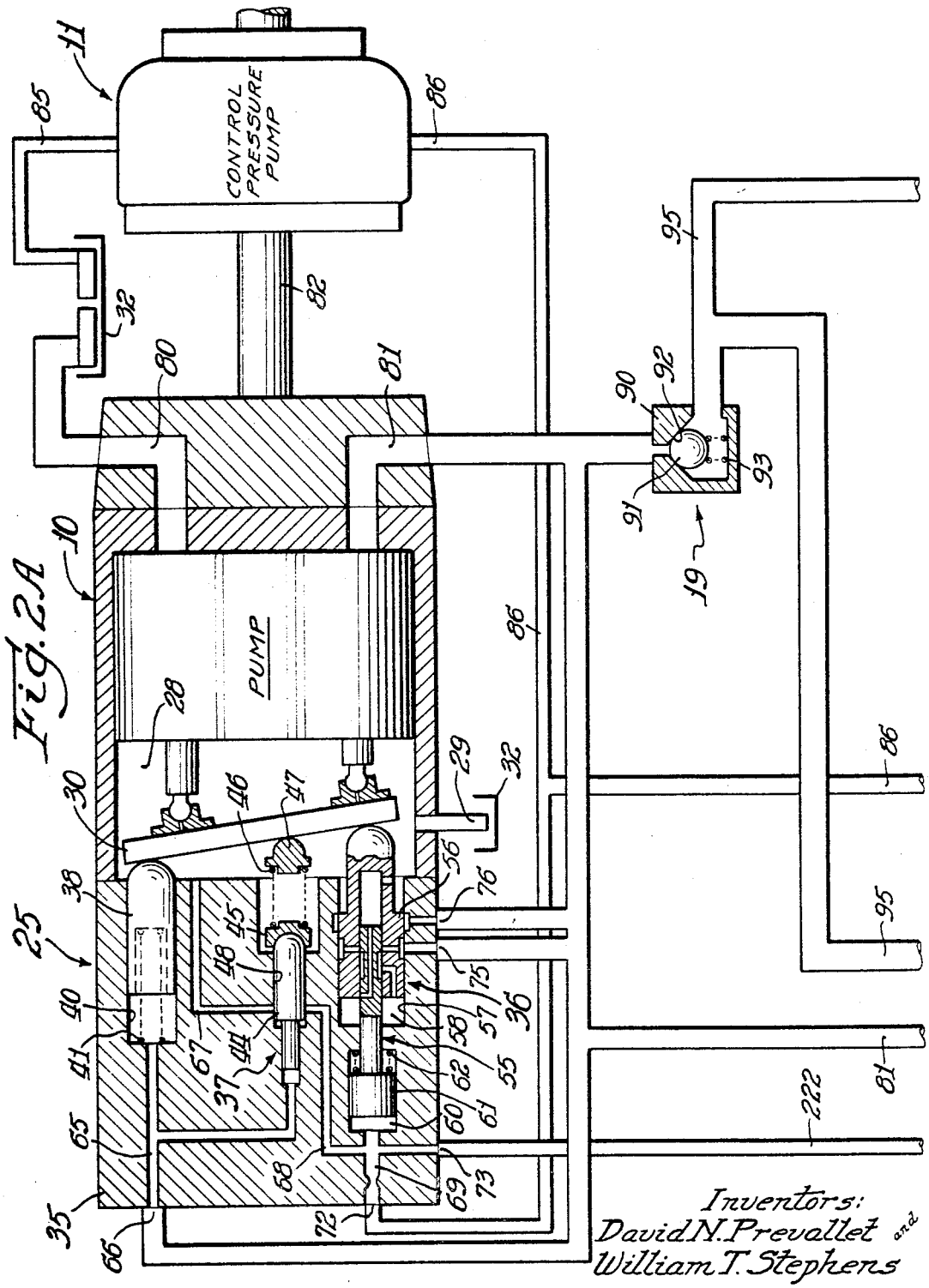

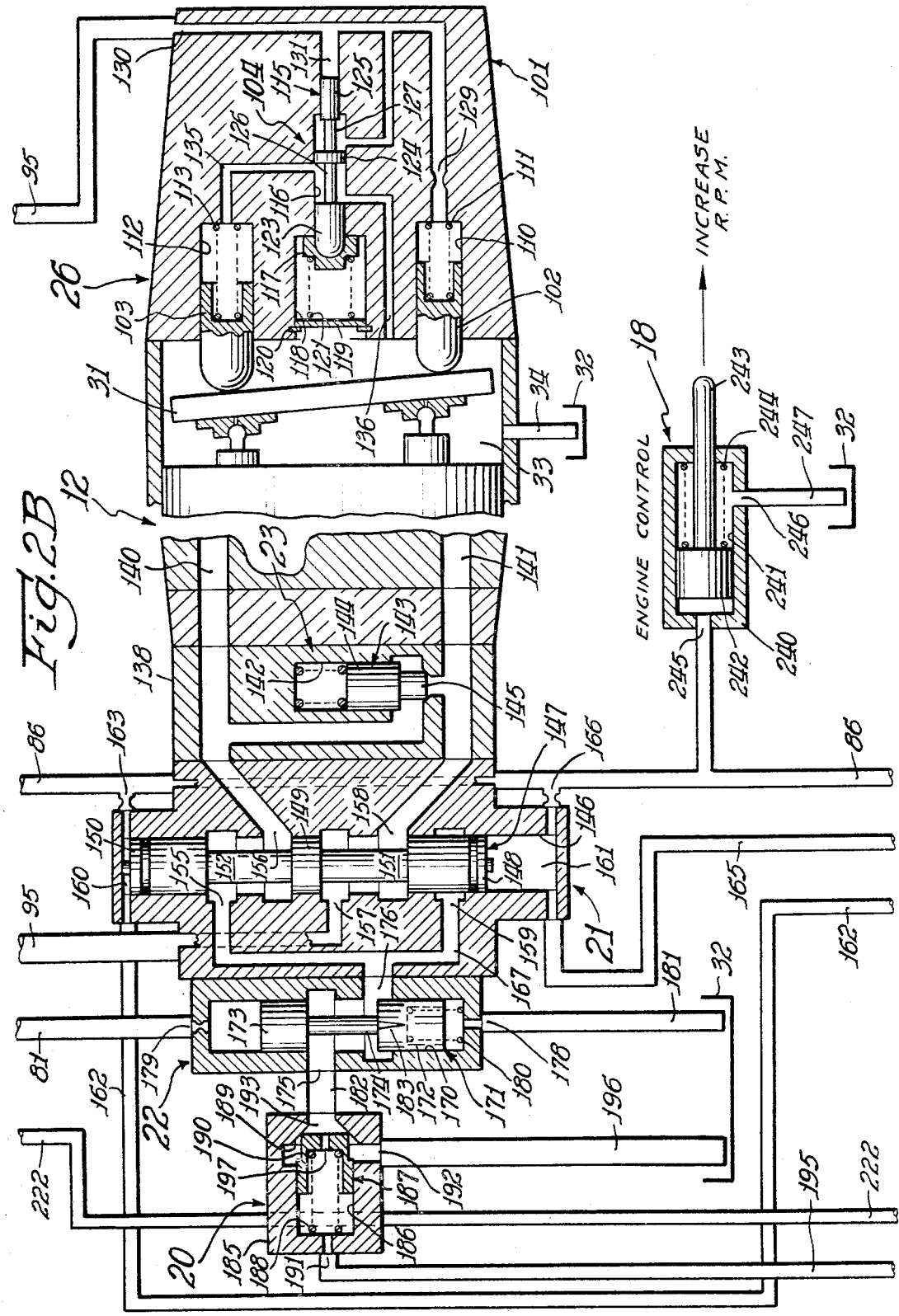

3,398,530
HYDROSTATIC TRANSMISSION
David N. Prevallet, Auburn, and William T. Stephens, Fort Wayne, Ind., assignors to Borg-Warner Corporation, Chicago, Ill., a corporation of Illinois
Filed May 24, 1966, Ser. No. 552,560
9 Claims. (Cl. 60—53)

ABSTRACT OF THE DISCLOSURE

A hydrostatic transmission for a vehicle utilizing a variable volume pump and a variable volume motor for its propulsion whereby rapid stopping, starting and reversal of direction of the vehicle are provided and including valve means which provide dynamic braking of the vehicle when the hydraulic motor over-speeds the hydraulic pump.

---

It is the object of this invention to provide an improved hydrostatic transmission for a vehicle having a variable volume pump and a variable volume motor wherein rapid stopping and starting and reversal of direction for the vehicle is provided, as for example is required for certain types of vehicles such as lift trucks and certain other special purpose vehicles. The present invention provides a system wherein a mechanism is provided so that a pair of control valves may be selectively operated to obtain forward or reverse operation from the transmission and also provide the function of increasing the tractive effort or speed of the vehicle in accordance with operator demand. The transmission also incorporates a valve means providing automatic or selective dynamic braking for the vehicle wherein the wheels driving the fluid motor make the motor act as a pump and the valve acts to partially block the outlet of the motor as it is pumping fluid thereby retarding motion of the vehicle.

The invention consists of the novel constructions, arrangements and devices to be hereinafter described and claimed for carrying out the above stated objects and such other objects as will appear from the following description of preferred embodiments of the invention illustrated with reference to the accompanying drawings wherein:

FIGURE 1 is a reference layout diagram for combining FIGURES 2A, 2B and 2C; and

FIGURES 2A, 2B and 2C present a schematic diagram of the hydrostatic transmission.

With reference to the drawings the present invention is illustrated showing a hydraulic transmission for vehicles including a variable volume pump 10 of the axial piston type, a control pressure pump 11 of fixed displacement, a variable volume fluid motor 12 of the axial piston type, a clutch and brake control valve 15, a reverse valve 16, a forward valve 17, a pilot operated relief valve 20, a direction control valve 21, an automatic brake valve 22, and an overload relief valve 23.

A swash plate 30 is provided for pump 10 and a swash plate 31 is provided for motor 11. A control mechanism 25 is provided for swash plate 30 of the pump 10 and a control mechanism 26 is provided for swash plate 31 of the motor 12. A sump 32 is schematically illustrated for the hydraulic fluid of the transmission.

The control system 25 for the fluid pump 10 is mounted within a casing 35 and includes a servo valve 26, a pressure compensating valve 37 and a biasing piston 38. The biasing piston 38 is slidable within a bore 40 within casing 35 and a spring 41 urges the piston 38 to the right and into engagement with swash plate 30 of the pump 10.

The pressure compensating valve 37 includes a piston 44 having an end cap 45 thereon engaged by a spring 46. Spring 46 engages a contact element 47 which is in engagement with swash plate 30. The piston 44 of the pressure compensator is mounted within a stepped bore 48 within casing 35.

The servo valve 36 includes a pilot valve 55 and a servo piston 56. Servo piston 56 engages a swash plate 30. Pilot valve 55 is slidable within servo piston 56. Servo piston 56 is mounted within a bore 57 and forms a pressure chamber 58 within the bore. A second chamber 60 is provided in the casing in which a head portion 61 of pilot valve 55 is slidable. A spring 62 engages the head portion 61 urging pilot valve 55 to the left as viewed in the drawings.

A fluid conduit 65 is provided in casing 35 which is connected to bore 40 for biasing piston 38 and to the end of pressure compensating piston 44 and is also connected to an exterior port 66. A fluid conduit 67 connects bore 48 for the pressure compensator 37 to the sump by means of a cavity 28 provided for swash plate 30 and a conduit 29; a fluid conduit 68 is connected to the pressure compensating valve 37 and to a conduit 69. Conduit 69 is connected to bore 60 of the servo valve 36 and to a pair of exterior ports 72 and 73. Casing 35 also includes a pair of ports 75 and 76 connected to bore 57 of the servo valve 36.

Pump 10 is provided with an inlet conduit 80 connected to sump 32 and an outlet pressure conduit 81. A shaft 82 transfers drive from the pump 10 to the control pressure pump 11. The control pressure pump 11 is provided with an inlet conduit 85 connected to sump 32 and an outlet pressure conduit 86.

Check valve 19 comprises a valve body 90 having a ball 91 therein which engages a seat 92 provided in the body 90. A spring 93 engages ball 91 and urges the ball into contact with seat 92. A fluid conduit 95 interconnects check valve 19 and the control system 26 for the motor 12.

The constant pressure control system 26 for the fluid motor 12 comprises a casing 101, a biasing piston 102, a control piston 103, and a pressure compensating valve 104. Biasing piston 102 is mounted within a bore 110 in the casing 101. A spring 111 urges the biasing piston 102 into engagement with the swash plate 31 of the motor 12.

Control piston 103 is mounted within a bore 112 in the casing 101 and also includes a spring 113 engaging the piston 103 and urging the piston 103 into contact with swash plate 31. The pressure compensating valve 104 comprises a valve spool 115 mounted with a bore 116 in the casing 101. The valve spool 115 has a head portion 117 thereon movable in a large bore 118 in the casing 101. The bore 118 is closed by an end plate 119 held in position by a snap ring 120. A spring 121 engages end plate 119 and head portion 117 of the piston 115. The piston 115 includes lands 123, 124 and 125 separated by grooves 126 and 127.

A fluid pressure conduit 130 is provided in the casing 101 which is connected to fluid pressure conduit 95. Fluid pressure conduit 130 is connected to the bore 110 for biasing piston 102 and to the bore 116 for the pressure control valve 104. A fluid pressure conduit 135 is provided interconnecting the bore 116 of pressure compensating valve 104 with the bore 112 for control piston 103. A fluid pressure exhaust conduit 136 is connected to bore 116 of pressure responsive valve 104 and to a cavity 33 for swash plate 31 and thereby to sump 32 by a conduit 34. Fluid pressure conduit 130 has a restriction 129 therein.

A valve casing 138 is provided for motor 12. The fluid motor 12 has fluid pressure inlet and outlet conduits 140 and 141 within casing 138. Either of the conduits may be the inlet or the outlet depending upon the position of the directional control valve 21. Mounted between pressure inlet and outlet passages 140 and 141 is an overload relief valve 23 which includes a bore 142 provided in the casing 138. A piston 143 is slidable in the bore. The piston 143 has a large land 144 and a smaller land 145.

Directional control valve 21 comprises a bore 146 provided in valve casing 138 having a valve spool 147 slidable therein. Valve spool 147 has lands 148, 149 and 150 thereon separated by grooves 151 and 152. Provided within the valve casing and opening into the bore 146 are ports 155, 156, 157, 158, 159.

The valve spool 147 and bore 146 define a pressure chamber 160 at the upper end of valve 21 and a pressure chamber 161 at the lower end of valve 21. Connected to the fluid pressure conduit 86 is a fluid pressure conduit 162 which passes through pressure chamber 160. A restriction 163 is provided in the conduit 162 near the fluid conduit 86. A fluid conduit 165 is connected to fluid conduit 86 and passes through pressure chamber 161. A restriction 166 is provided in the connection between conduit 165 and conduit 86. Ports 155 and 159 of directional control valve 21 are connected by a fluid conduit 167 which leads to the automatic brake valve 22. Port 157 is connected to fluid pressure conduit 95. Port 156 is connected to pressure conduit 140 and port 158 is connected to pressure conduit 141.

The automatic brake valve 22 comprises a bore 170 provided in the valve casing 101. Mounted within the bore is a spool 171 having lands 172 and 173 thereon separated by a groove 174. Ports 175, 176, 178, and 179 are provided in communication with bore 170 of the automatic brake valve 22. Port 179 is a restricted port as is port 178. A spring 180 is provided which urges the piston 171 up as viewed in the drawing. Port 176 is connected to the fluid conduit 167 which is connected to the directional control valve 21 as above described. Port 178 is connected to a conduit 181 leading to sump 32. Port 179 is connected to conduit 81. Port 175 is connected to a conduit 182 leading to the relief valve 20. A metering notch 183 is provided in land 172 of the piston 171.

Pilot operated relief valve 20 comprises a valve casing 185 having a bore 186 therein. Slidable within the bore 186 is a piston 187 which is urged to the right as viewed in the drawing by spring 188. A valve seat 189 is provided in the valve casing 185 which the valve piston 187 may engage. Valve piston 187 has a stepped diameter thereon having a reduced diameter end portion 190 which provides a differential area on the piston. Ports 191, 192 and 193 are provided in the valve casing 185. Port 193 is connected to fluid conduit 182; port 191 is connected to fluid conduit 195 which is connected to the clutch and brake control valve 15. Port 192 is connected to the sump 32 by a conduit 196. The valve piston 187 has a restricted hole or orifice 197 in the head portion thereof.

Clutch and brake control valve 15 includes a valve casing 200 having a bore 201 therein, a foot pedal 202 is provided which has a head portion 203 slidable within a reduced diameter portion 204 of the bore 201. Also provided within the bore 201 is a piston element 206 of generally cup-shaped configuration. A spring 208 is provided between head portion 203 and piston element 206. The spring 208 is held in position by piston element 206. A spring 209 is provided which engages the foot pedal 202 and the valve casing 200. A seat 210 is provided in the valve casing 200 which is engageable by piston 206. The valve casing 200 includes ports 212, 213, 214 and 216. Port 216 is connected to fluid conduit 195. Port 214 is connected to a fluid conduit 220 leading to sump 32. Port 212 is connected to a fluid conduit 221 leading to sump 32 and port 213 is connected to a fluid conduit 222 which is connected to port 73 of the pump control system 25.

Reverse control valve 16 and forward control valve 17 are of similar structure to the clutch and brake control valve 15. Like parts of the reverse control valve 16 with those of clutch and brake control valve 15 are numbered the same as those of valve 15 with the addition of an "a" following the number. Like parts of the forward control valve 17 have identical numbers with clutch and brake control valve 15 with the addition of the letter "b" following the numbers. Valves 16 and 17 have a pair of plungers 231 and 232 having head portions 203a and 203b respectively, of cup-shaped configuration provided thereon. A piston element 207 is provided in bores 201a and 201b respectively which is also cup shaped. The springs 208a and 208b engage elements 207 and 206a and 206b respectively. The spring 209a engages head portion 203a and piston element 207. The spring 209b engages head portion 203b and piston element 207.

A common foot pedal 202a is provided which is operatively associated with each of the valves 16 and 17. The foot pedal 202a pivots about a central point 230. The foot pedal 202a engages plunger 231 of the reverse control valve and plunger 232 of the forward control valve to thereby actuate same. The reverse and forward control valves 16 and 17, as will be obvious to one of ordinary skill in the art, can be actuated by separate foot pedals such as the foot pedal 202 of clutch and brake control valve 15.

Port 212b of forward control valve 17 is connected to fluid conduit 165; port 216b is connected to conduit 86. A fluid pressure conduit 233 interconnects port 216a of valve 16 and port 214b of valve 17. A fluid pressure conduit 235 interconnects port 212a of valve 16 and port 213b of valve 17.

The fluid conduit 234 is also connected to sump 32. Port 214a of valve 16 is connected to a conduit 235 leading to the sump 32. Port 213a of valve 16 is connected to fluid pressure conduit 162.

Engine control valve 18 includes a valve casing 240 having a bore 241 therein. Slidable within the bore is a piston 242, a rod 243 is integral with the piston 242 and is connected to the fuel control for the engine so as to be operative to change the engine r.p.m. A spring 244 engages piston 242 and urges it to the left in an engine r.p.m. decreasing direction as viewed in the drawing. Ports 245 and 246 are include in the valve casing 240. Port 245 is connected to fluid pressure conduit 86. Port 246 is connected to a fluid pressure conduit 247 leading to sump 32.

The operation of the control system of the subject invention is as follows: the variable volume pump 10 supplies pressure through conduit 81 to ports 75 and 76 of servo control valve 36; to port 66 in valve casing 35, and through conduit 65 to biasing piston 38, and pressure compensator 37; to check valve 19; and to port 179 of automatic brake valve 22.

Servo control valve 36 is a pressure responsive valve which is operated in response to increasing pressure in conduit 72 as selectively determined by the operator to increase the swash plate angle and thereby increase the pump displacement and the tractive efforts available through the transmission. Pressure in conduit 86 is supplied by the control pressure pump 11. The pressure in conduit 86 is determined or selected by the operator in accordance with the amount of depression of the foot pedal 202a in either the reverse or forward directions as will later be described.

Pressure in conduit 86 is communicated through port 72 of valve casing 35 to bore 60 and acts on piston 61 to move the pilot valve 55 to the right. Movement of pilot valve 55 to the right will cause the servo piston 56 to move to the right to increase the pump swash plate angle since piston 56 will follow exactly axial movement of pilot valve 55 through utilization of the main pump pressure supplied through port 75 and conducted to chamber 58. The servo control valve 36 acts in a known manner in which the piston 56 follows axial movement of the pilot valve 55 as has been previously disclosed in U.S.

Patents Nos. 3,213,617 and 3,241,317 of common assignee.

The biasing piston 38 receives fluid pressure from main pressure conduit 81 and conduit 65 and acts as a means to return the swash plate 30 to the neutral position and serves as a force for the servo piston 56 to work against. The pressure compensating valve 37 also receives main pump fluid pressure through conduit 65 and, depending upon the setting of spring 46 as determined by the position of swash plate 30, will move in response to fluid pressure in conduit 65 and may move to a point to interconnect fluid conduit 68 with fluid conduit 67 thereby exhausting conduit 68 and reducing the pressure on the piston 61 which would allow spring 62 to return pilot valve 55 to the left and reduce the swash plate angle to reduce flow from the pump. Thus the compensating valve 37 has a variable range depending upon the position of the pump swash plate. When the maximum pressure setting of the compensating valve 37 is exceeded depending upon the position of swash plate 30 the valve 36 will be operated as described above to reduce flow and increase pressure of pump output to increase the mechanical advantage through the transmission to compensate for increased torque load on the motor unit.

Main pump pressure in conduit 81 will open check valve 19 to supply pressure through conduit 95 to port 157 of directional control valve 21. This pressure will then be conducted either through conduit 141 or conduit 140 to the motor 12 to rotate motor 12 to perform the work desired. The pressure will be supplied to either of the conduits 140 or 141 as determined by the position of the directional control valve 21 as determined by the operator through operation of foot pedal 202a in a manner to be described later. Main fluid pump pressure will also be supplied through conduit 95 and fluid conduit 130 to the constant pressure control system 26 for motor 12.

Referring to control system 26, fluid pressure in conduit 130 will flow through restriction 129 to act on piston 102 which serves as a biasing piston for the motor swash plate 31. The piston 103 is in contact with the swash plate 31 and controls the position of the swash plate 31.

Fluid pressure in conduit 130 will flow into conduit 131 and will act on the valve spool 115 of pressure compensating valve 104 to move the valve spool 115 to the left against the force of spring 121 and at a certain point can then open fluid conduit 135 to conduit 130 to allow fluid pressure to be supplied into bore 112. Fluid pressure in bore 112 will act on the biasing piston 103 to increase the motor displacement thereby decreasing motor speed and maintaining constant pressure in the motor-pump circuit. In this way the compensating valve 104 can be effective to maintain a constant pressure in the system through manipulation of swash plate 31. With the pressure at some predetermined lower value in conduit 130 valve spool 115 may be to the right as shown in the drawing in which position bore 112 is connected through conduit 135 to groove 126 into conduit 136 and to the sump thus draining the fluid pressure from behind control piston 103 which would thus allow the swash plate 31 to move to its minimum angle and tend to increase motor speed within the conduit 95 by reducing displacement of the motor 12. Thus the compensating valve 104 can operate in a manner to maintain a constant pressure within the transmission system and in conduit 95.

Pressure relief valve 23 will operate to prevent a predetermined maximum pressure from being exceeded depending upon the setting of spring 142 and the size of diameters 144 and 145 on piston 143. If conduit 141 is the main pressure supply to the motor for example, and the pressure exceeds a predetermined value it will act on land 145 of piston 143 to move piston 143 up and interconnect conduits 141 and 140 until the pressure is relieved. Likewise, pressure in conduit 140 can act on the differential area between lands 144 and 145 on valve 23 to move piston 143 up and interconnect conduits 140 and 141.

When the operator is calling for tractive speed through operation of either the forward or reverse control valve 16 or 17 the pressure in conduit 86 will increase. This pressure communicates with port 245 of engine control valve 18 to operate to increase the engine r.p.m. by moving the valve piston 242 to the right against force of spring 244 to increase the engine speed to increase the range of operation of the vehicle rather than depending on a single vehicle engine speed for performing work.

Forward and reverse control valve 16 and 17 operate in an identical manner to determine the pressure which will exist in control pressure conduit 86, therefore only the operation of the forward control valve 17 will be explained. When the operator desires to move in the forward direction and the right hand side of pedal 202a is thus depressed, the plunger 232 will be moved down which will interconnect fluid ports 212b and 213b to connect fluid conduit 165 to the sump through conduit 234. When this takes place pressure in the bore 146 of directional control valve 21 on the lower end thereof will be reduced due to the action of restriction 166 between conduit 165 and the pressure conduit 86. The valve spool 147 will move down as illustrated in the drawing due to the continued existence of pressure on the upper end of land 150 the pressure being supplied through conduit 86 and restriction 163 thus initially with depression of the foot pedal in the forward direction the forward position of the directional control valve 21 is selected in which main pump pressure in conduit 95 will flow through groove 152 of the valve spool 147 and port 156 into pressure conduit 140 to operate the motor in the forward direction.

After the direction of rotation of the motor has been determined and the operator continues to depress the pedal in the forward direction the spring loading through spring 209b will increase moving piston element 207 down increasing spring loading of spring 208b on piston element 206b and tend to seat piston 206b against seal 210b. The normal flow of fluid from conduit 86 through port 216b raising piston 206b and through port 214b into conduit 233 and then through control valve 16 to the sump will be resisted and this will cause an increase in the fluid pressure within conduit 86. As previously discussed, increasing pressure in conduit 86 will act on piston 61 of the servo control valve 36 to move swash plate 30 from its minimum angle to a particular position in accordance with the pressure in conduit 86. Thus as the operator continues to increase pressure in conduit 86 by further depression of pedal 202a a maximum tractive speed will be developed through movement of the swash plate angle of pump 10 to its maximum angle, and with the swash plate 31 of the motor unit 12 at its minimum angle, and also by increase of engine r.p.m. by action of valve 18 so that any particular speed desired can be obtained by the operator merely through the amount of depression of the pedal 202a. As previously stated the reverse control valve 16 works in a similar manner to initially position the valve spool 147 of directional control valve 21 in its upper position as illustrated in the drawing, thus causing the motor 12 to operate in the reverse direction and following that by increasing pressure in conduit 86 to control or increase the tractive effort as described above with regard to the forward control valve 17.

When the transmission is operating, fluid pressure will normally flow from port 176 through grooves 174 into port 175 of automatic brake valve 22 and then through pilot operated relief valve 20 to the sump. If the setting of brake valve 22 is exceeded, as when the engine is turned off and the pump is not operating or when a condition exists as for example when the vehicle is rolling down hill and the motor is overdriven with respect to the pump and if, for example, the reverse direction of operation is taking place, conduit 140 is normally the outlet from the motor or the exhaust pressure conduit through groove 152, port 155, conduit 167 and through automatic brake valve 22 to the sump. When the overdriving condition of the wheels exists, conduit 140 will become the pressure output conduit of the motor as it acts as a pump when being overdriven by the wheels. When this exists the main pressure supply conduit 81 for the motor will have a reduced pressure therein with a tendency for a vacuum to be created as the motor will be demanding more fluid than the pump is supplying. With this vacuum existing spring 180 of automatic brake valve 22 can operate to move valve spool 171 to the upper position to block port 176 thus blocking the outlet for the motor 12 as it acts as a pump thus providing a braking action on the motor 12.

In a like manner when the engine is shut off and the pump is not operating the spring 180 will move valve spool 171 to the upper position to block port 176. This, along with check valve 19 will block both motor ports, and thereby prevent motion in either direction. A metering slot 183 has been provided in land 172 of the valve 22 so that the automatic brake valve 22 gradually blocks the output from motor 12 when it acts as a pump to produce a gradual retardation of the vehicle movement and prevent a harsh stop or jerk. Whenever the transmission is operating in the normal manner with the pump 10 supplying pressure, the pressure flowing through restriction 179 will hold the valve spool 171 of valve 22 in the lower position opening the exhaust conduit from the motor 12 to the sump through pilot operated relief valve 20.

The clutch and brake control valve 15 is operative to interrupt the drive between the fluid pump and fluid motor much the same as a standard clutch in a geared transmission vehicle can operate and also is operative to provide a dynamic braking effect for retarding the vehicle when desired by the operator. When pedal 202 of the valve 15 is initially depressed port 213 will be interconnected with port 212 which will connect conduit 222 through conduit 221 to sump 32 thus draining the pressure acting on piston 61 of valve 36. Thus when the foot pedal 202 is first depressed the pump swash plate will be moved to its minimum displacement position through exhaust of fluid pressure from the bore 60 of servo control valve 36. Thus tractive effort to the driving wheels has been interrupted.

If the operator continues to depress pedal 202 further, piston element 206 through increasing load of spring 208 will be held against seat 210 with increasing force thus causing a pressure increase in conduit 195 which will normally have a certain amount of fluid therein which is passed through the orifice 197 in piston 187 of valve 20. As this pressure builds up in conduit 195 the effective fluid pressure within bore 186 on the left side of piston 187 of valve 20 will increase tending to hold the piston 187 against its seat 189 thus causing valve 20 to block the pressure output from motor 12 as it tries to act as a pump when the vehicle is coasting and the operator is calling for dynamic brake effect. Thus the braking effect can be varied by the operator depending upon the amount of depression of the foot pedal 202 which can vary the pressure in conduit 195 and thus vary the amount of fluid which may flow through valve 20 to the sump 32 from the motor 12 when it acts as a pump under coast conditions.

From the above it will be apparent that the present invention provides an improved and novel transmission mechanism which can be used in many types of vehicle applications where exact control is desired over the speed of the vehicle, the tractive effort available, and the engine r.p.m. to perform certain work desired. The forward and reverse control valves are arranged to be operated in a simple manner by the operator so that in vehicle applications such as industrial lifting trucks the direction of the vehicle can be rapidly changed as would be desired when moving stock or performing work of this type and due to the type of valve mechanism utilized the stopping and starting of the vehicle will be smooth and efficient. The clutch and brake control valve 15 provides a smooth working clutch mechanism to interrupt drive and a dynamic brake for the vehicle which may be applied by the operator to control precisely the amount of braking effort desired to be applied to the vehicle. With the improved transmission disclosed the amount of controls to be actuated by the operator have been reduced to a minimum since the displacement of the pump and motor units is automatically controlled to supply the tractive effort as desired by the operator. The operator is required only to depress a single pedal when calling for tractive effort either in the forward or reverse direction and not requiring operation of a separate accelerator pedal to perform this function. Engine r.p.m. is also automatically controlled to supply the horsepower which is demanded automatically.

With the improved structure of the present invention a transmission is provided which although being hydraulic is effective to prevent inadvertent movement of the vehicle when it is parked due to the operation of an automatic brake valve which is provided adding a desired safety feature to the vehicle. Likewise at any time when the engine of the vehicle fails or the pump would be inoperative for any reason the vehicle will be automatically retarded to a stop with the improved and novel brake control valve immediately acting as a dynamic brake on the vehicle. Further, the improved transmission mechanism utilizes a separate and smaller pump unit for control pressure within the control system of the transmission thereby allowing use of hydraulic valves and springs of a much smaller and more economical nature than would be demanded if the main pump pressure was used within the control system. Through use of the separate control pump the controls may be more reliable since a relatively constant pressure is supplied for control assuring a constant engine r.p.m.

Various of the features of the invention have been particularly shown and described; however, it should be obvious to one skilled in the art that various modifications may be made therein without departing from the scope of the invention.

The embodiments of the invention in which an exclusive property or privilege is claimed are defined as follows:

1. A hydraulic transmission for a vehicle including an engine comprising a fluid motor, a fluid pump, a sump for said tranmission having fluid therein, said pump being operable to draw fluid from said sump and supply fluid under pressure to said motor to operate said motor, a fluid relief valve being connected to said sump whereby exhaust fluid pressure from said motor normally flows through said relief valve to said sump, a second valve connected between said motor and said relief valve insulated from the effect of said motor exhaust fluid pressure, said second valve being operative to block fluid exhaust pressure from said motor from flowing to said relief valve when the pressure supplied to said motor drops below a predetermined value.

2. A transmission as claimed in claim 1 wherein said second valve has a first position blocking fluid communication between said fluid motor and said relief valve and a second position opening the communication between said fluid motor and said relief valve, said second valve being connected to the pressure supplied by said pump whereby in response to a predetermined value of said pressure and independent of said motor exhaust fluid pressure, said second valve moves to said second position and then to said first position when the pressure drops below said predetermined value whereby operation of said fluid motor is retarded when said pressure drops below the predetermined value to provide a dynamic braking effect for the vehicle when the engine of the vehicle is stalled or when the motor is attempting to overrun the pump.

3. A transmission mechanism as claimed in claim 2 wherein a spring urges said second valve to its first position.

4. A transmission as claimed in claim 3 wherein said second valve includes a valve spool having a land operative to block said fluid communication between said motor and relief valve when said valve is in its first position, a metering notch in said land to provide a gradual blocking of communication between said motor and relief valve.

5. A hydraulic transmission mechanism for a vehicle including an engine comprising a fluid motor, a fluid pump, a fluid sump for said transmission, a swash plate for said pump being movable to vary the displacement of said pump, said pump being connected to draw fluid from said sump and supply fluid under pressure to said motor, a source of control fluid pressure, a servo control valve connected to said swash plate and said source of control fluid pressure and operative to increase displacement of said pump by movement of said swash plate in response to said control pressure, a manually operated valve connected between said sump and said servo valve, said manually operated valve being actuatable to drain said control pressure from said servo valve to said sump whereby said swash plate of said pump will be moved to its minimum pump displacement position so that said manually operated valve interrupts drive between said pump and motor units, said manually operated valve also being connected to a relief valve, said relief valve being connected to receive exhaust fluid pressure from said motor unit, said manually operated valve normally allowing fluid pressure to flow from said relief valve to the sump and being operative when said manually operated valve is actuated beyond its drive interrupting position to increase the effective pressure response of said relief valve to increasingly block exhaust pressure from said motor unit whereby operation of said motor is retarded to provide a dynamic brake for the vehicle.

6. A transmission mechanism as claimed in claim 5 wherein said manual valve includes a seat, an actuating means, a piston element engageable with said seat, said piston element when engaged with said seat interrupting fluid comunication between said relief valve and said sump, a spring means operatively interconnecting said piston element and said actuating means whereby said piston element can increasingly shut off communication between said relief valve and said sump as said actuating means is further depressed to provide a dynamic braking effect in accordance with operator demand.

7. A transmission mechanism as claimed in claim 6 wherein said relief valve includes a piston element, a seat for said piston element, a spring engaging said piston element on the opposite side with respect to said seat and urging engagement with said seat, exhaust pressure from said motor unit normally moving said piston from said seat to allow said exhaust pressure to flow to the sump, an orifice in said piston element allowing said fluid pressure to flow through said piston element to said manually operated valve whereby when said manually operated valve is depressed to provide said dynamic braking the pressure on the opposite side of said piston element from said seat will be increased to hold said piston element against said seat with increasing force in accordance with operator demand.

8. A transmission mechanism including a fluid pump and a fluid motor, said pump being operable to supply fluid pressure to said motor to operate the motor, a control valve connected between said pump and said motor, said motor having a pressure inlet and a pressure outlet passage which are interchangeable in function, said control valve having a first position allowing one of said pressure passages to be the pressure inlet passage for said motor and a second position allowing the other pressure passage to be the pressure inlet passage, a pressure chamber at each end of said control valve, a source of fluid pressure supplying fluid pressure to the chamber at each end of said control valve, a forward control valve and a reverse control valve, wherein each of said forward and reverse control valves are manually actuatable and include a valve element normally allowing communication between said source or pressure and said sump, said forward control valve being connected between one of said pressure chambers and said sump, and said reverse control valve being connected between the other pressure chamber and said sump whereby actuation of said forward control valve will exhaust fluid pressure from the corresponding chamber to allow said control valve to assume its first position to allow fluid pressure from said pump to enter the passage of said motor which will operate said motor in the forward direction and whereby when said reverse control valve is actuated the other of said chambers of said control valve will be exhausted to allow said control valve to move to its second position allowing fluid pressure from said pump to flow into the other pressure passage of said motor unit so that said motor unit will operate in the reverse direction, said forward and reverse control valves being operative when actuated beyond the point at which said control valve moves to its first or second position to block communication between said pressure source and said sump whereby said pressure supplied by said pressure source will increase and thereby actuate said servo control valve to automatically increase displacement of said pump unit to thereby vary the flow of fluid from the pump output in accordance with operator demand on said forward or reverse control valve.

9. A transmission as claimed in claim 8 wherein said means in said forward and reverse control valves comprises a seat, a plunger, a piston element engageable with said seat to block communication between said pressure source and said sump, a spring means engaging said piston element and said plunger, manual actuation of said plunger of either of said forward and reverse control valves being operative to increase the loading of said spring on said piston element to hold said piston element against said seat with increasing force to increase the pressure of said pressure source in accordance with operator demand to provide varying tractive effort for the vehicle through actuation of said servo control valve.

References Cited
UNITED STATES PATENTS

| | | | |
|---|---|---|---|
| 2,328,979 | 9/1943 | Herman et al. | 60—52 XR |
| 2,345,974 | 4/1944 | Harrington | 60—52 |
| 2,500,627 | 3/1950 | Chinn | 60—53 XR |
| 2,599,450 | 6/1952 | Henning | 60—53 |
| 2,961,829 | 11/1960 | Weinsenbach | 60—53 |
| 3,117,420 | 1/1964 | Young | 60—52 |
| 3,243,959 | 4/1966 | Fantom | 60—53 |
| 2,363,111 | 11/1944 | Bennett | 91—51 XR |
| 2,870,789 | 1/1959 | Bilaisis | 60—52 XR |

EDGAR W. GEOGHEGAN, *Primary Examiner.*